United States Patent [19]

Rafferty et al.

[11] Patent Number: 5,263,641

[45] Date of Patent: Nov. 23, 1993

[54] METHOD OF BONDING HARD METAL OBJECTS WITH BRAZE SLURRY

[75] Inventors: Kevin Rafferty, Harrison; Bruce Rowe, Cincinnati, both of Ohio

[73] Assignee: Coating Applications, Inc., Cincinnati, Ohio

[21] Appl. No.: 971,272

[22] Filed: Nov. 4, 1992

[51] Int. Cl.$^5$ .............. B23K 35/14; B23K 35/36
[52] U.S. Cl. .................. 228/220; 228/224; 228/248.1; 148/24; 148/26
[58] Field of Search .......... 228/206, 220, 224, 248; 148/24, 26

[56] References Cited

U.S. PATENT DOCUMENTS

| | | | |
|---|---|---|---|
| 3,743,556 | 7/1973 | Breton et al. | 156/62.8 |
| 3,778,586 | 12/1973 | Breton et al. | 219/76 |
| 3,917,149 | 11/1975 | Breton et al. | 228/124 |
| 3,997,447 | 12/1976 | Breton et al. | 210/360 |
| 4,016,345 | 4/1977 | Holmes | 526/206 |
| 4,042,747 | 8/1977 | Breton et al. | 428/323 |
| 4,188,237 | 2/1980 | Chasteen | 228/206 |
| 4,231,815 | 11/1980 | Snyder | 148/24 |
| 4,325,754 | 4/1982 | Mizuhara et al. | 148/22 |
| 4,405,379 | 9/1983 | Chasteen | 228/206 |
| 4,477,527 | 10/1984 | Grosner | 428/401 |
| 4,563,329 | 1/1986 | Morishita et al. | 419/9 |
| 4,596,746 | 6/1986 | Morishita et al. | 428/458 |

*Primary Examiner*—Kenneth J. Ramsey
*Attorney, Agent, or Firm*—Wood, Herron & Evans

[57] ABSTRACT

A braze paste is disclosed for brazing superalloys together which includes an organic binding system, a major amount of a nickel, cobalt, gold, silver, copper or palladium based braze alloy and ground polytetrafluoroethylene. The braze paste can be used to braze superalloys together without prior nickel treatment. In the brazing step, the polytetrafluoroethylene decomposes and forms fluoride ions which in turn acts on any oxide that may form during the brazing step to remove the oxide and permit a good braze between the metal objects.

10 Claims, No Drawings

METHOD OF BONDING HARD METAL OBJECTS WITH BRAZE SLURRY

BACKGROUND OF THE INVENTION

Brazing is one of many ways frequently used to bond metal objects together. According to this bonding method, brazing powder is placed at the connection point between the two objects and they are heated until the brazing powder melts which in turn bonds the objects together. Particularly in the aerospace industry, this is used to assemble various parts of a jet engine.

Using brazing powders is particularly difficult and inefficient. Getting the brazing powder in position, in the right quantities evenly distributed is difficult. Maintaining it in position is also difficult.

There are composite products which are the braze powders held together by binding material. Vitta Corporation sells such a product. But the product is relatively rigid and requires special forming tools that are very expensive. Due to the nature of the product, it is very difficult to use. Other binders are unsuitable because they leave ash behind on the surface which interferes with the bonding or corrode the treated metal surface.

In many applications, a braze slurry is required. Braze slurries are powdered brazing alloys held together as a paste by one of several well known organic binding system. When superalloys are brazed together, a metal oxide can form at the braze surface. This is particularly a problem with superalloys formed from aluminum, titanium, hafnium, and chromium. When these are heated above 800° F. even a trace of oxygen in the braze furnace can form an oxide with these metals. This can prevent adequate bonding of the surfaces.

To prevent this, the parts are frequently nickel coated to prevent oxide formation. Nickel coating is undesirable because it is an expensive additional step. It can require not only coating of the selected area, but also masking of other areas to avoid nickel plating on other surfaces.

SUMMARY OF THE INVENTION

The present invention is premised on the realization that two objects can be bonded together using a brazing technique wherein the brazing powder is held in a paste brazing composite formed from an organic binder.

More particularly, the present invention is premised on the realization that two superalloy objects can be bonded together without prior nickel coating using a brazing paste wherein the brazing paste includes a minor amount of finely ground powdered polytetrafluoroethylene. The paste composition of the present invention is used in the same manner as prior brazing pastes with the exception that the nickel pretreatment is unnecessary. The polytetrafluoroethylene, upon heating, forms a gas which acts to clean the surface of the metal objects even while the binder system itself is being thermally decomposed. This cleans the surface of the metal eliminating the need for prior nickel coating. The objects and advantages of the present invention will be further appreciated in light of the following detailed description.

DETAILED DESCRIPTION

The present invention is a method of bonding two hard metal surfaces together using a brazing technique. Hard metal surfaces include, of course, all forms of stainless steel as well as nickel, cobalt, titanium and tungsten based superalloys such as, in particular, Rene 35, Rene 41, Rene 77, Rene 80, Rene 80H, Rene 95, Rene 125, Rene 142, Inconel 713, Inconel 718, and Waspalloy. Other applicable nickel based alloys containing significant percentages of aluminum, titanium or other difficult to reduce potential oxide formers can also be used in the present invention.

The objects are bonded together using a brazing technique by applying the brazing paste of the present invention at the adjoining surfaces of the objects being bonded together and heating this to an effective brazing temperature.

The braze paste of the present invention includes the braze alloy powder, a binder, and finely ground polytetrafluoroethylene.

The braze paste will include from about 75% to about 84% of a brazing alloy. There are many brazing alloys which can be used in the present invention and these can simply be purchased. The makeup of several of these brazing alloy powders are

| 1. Boron | 2.9 |
|---|---|
| Nickel | 92.6 |
| Tin | 4.5 |
| 2. Boron | 3.0 |
| Chromium | 7.0 |
| Iron | 3.0 |
| Nickel | 83.0 |
| Silicon | 4.0 |
| 3. Chromium | 19.0 |
| Nickel | 71.0 |
| Silicon | 10.0 |
| 4. Boron | 1.8 |
| Nickel | 94.7 |
| Silicon | 3.5 |
| 5. Boron | 0.8 |
| Cobalt | Balance |
| Chromium | 19.0 |
| Nickel | 17.0 |
| Silicon | 8.0 |
| Tungsten | 4.0 |
| 6. Boron | 2.75 |
| Chromium | 10.5 |
| Nickel | 50.3 |
| Palladium | 36.0 |
| Silicon | 0.5 |

Such braze alloys can be purchased from companies such as Westgo, Praxair and others.

In addition to the brazing alloy, the braze paste will include a binding system. Again, binding systems are commercially available. These are generally organic high molecular weight materials such as glycerol based binders, petroleum based binders and organic polymeric systems such as acrylic based binders, alginate based binders and gelatin based binders. Other materials such as starch and other organic polymeric systems which can be applied as a paste at room temperature can be employed. These can be purchased from Metal Methods, Fusion Inc., Wall Colmonoy Corporation and Vitta Corporation.

The third component of the present invention is ground powdered polytetrafluoroethylene. Generally from about 1 to about 6% by weight of the powder will be employed. This preferably is ground to a fineness of −125 mesh or finer. A preferred grade is −325 mesh.

To formulate the mixture of the present invention, the binder is formulated per the instruction. The binder, PTFE and braze alloy are then combined in a mixing vessel. Using a stainless steel or other suitable stirring mechanism, the components are mixed until a uniform paste with the brazed alloy and the polytetrafluoroethylene evenly suspended therethrough is formed.

This is then used by applying the paste to the desired brazed joint area. By smearing the paste onto the desired area using the spatula or any other suitable article or by pneumatic or hand pressure application through a tube/needle assembly, much like a medical syringe or toothpaste tube. The paste is allowed to harden generally over 30 minutes.

The metal objects with the braze paste in position are bonded together by heating the objects and the paste to a temperature of at least 800° F. to 2300° F. which causes the binder composition to breakdown and evaporate and likewise causes the polytetrafluoroethylene to breakdown and evaporate. Over this temperature range, the braze alloy will melt. As the polytetrafluoroethylene decomposes, fluoride ions are formed which act on the surface of the basis metal to remove any oxide that may form during the application of the paste or the thermal decomposition of the paste. Generally, for nickel and cobalt alloys, the preferred braze temperature is about 1750° F. or higher.

Upon cooling, the metal surfaces are then brazed together. Thus, by using the present invention, two objects can be brazed together using a paste without the need for any prior nickel coating. The polytetrafluoroethylene itself evaporates and cleans the surface and does not leave any residue which would interfere with bonding. Thus, the present invention improves the brazing operation and reduces labor costs. The advantages of the present invention will be further appreciated in light of the following detailed examples.

EXAMPLE

A laminated assembly, made from Rene 41 is to be brazed using AMS 4777 braze alloy powder. The assembly is comprised of three plates which lie on top of one another. It is normally desirable to nickel plate the braze joint surfaces to prevent possible oxide formation during the braze cycle. Use of the present invention, comprised of AMS 4777 braze powder, 77% by weight, 20% of an acrylic binder, and 3% PTFE resin will eliminate this plating operation. The slurry, after mixing, is thinly spread across the mating surfaces using a spatula, the part assembled, with any excess slurry squeezed and removed from the edges of the assembly with the part subsequently processed through a braze cycle at approximately 1925° F. in vacuum.

Thus, as shown above, the present invention effectively brazes metal objects together without prior nickel treatment.

Although this has a been a description of the present invention and the best mode of practicing the invention, the invention itself should be defined only by the appended claims wherein we claim:

1. A brazing paste comprising:
   an organic binding system;
   a major portion of a brazing alloy and a minor portion of ground polytetrafluoroethylene.

2. The brazing paste claimed in claim 1 wherein said brazing alloy is a brazing alloy selected from the group consisting of nickel, cobalt, gold, silver, copper, and palladium based brazing alloy.

3. The brazing paste claimed in claim 2 wherein said composition comprises from about 1 to about 6% ground polytetrafluoroethylene.

4. The brazing paste claimed in claim 3 wherein said binder is selected from the group consisting of glycerol, acrylic binders, petroleum based binders, alginate based binders and gelatin based binders.

5. The method claimed in claim 3 wherein said brazing alloy comprises from about 75 to about 84% of said composition by weight.

6. A method of bonding two metal surfaces together comprising applying at a conjoined surface of said two objects a brazing paste without prior nickel coating of said metal objects;
   wherein said brazing paste comprises the brazing paste claimed in claim 1 and heating said objects to a temperature effective to cause said brazing alloys to melt and braze said objects.

7. A method of bonding two metal surfaces together comprising applying at a conjoined surface of said two objects a brazing paste without prior nickel coating of said metal objects;
   wherein said brazing paste comprises the brazing paste claimed in claim 2 and heating said objects to a temperature effective to cause said brazing alloys to melt and braze said objects.

8. A method of bonding two metal surfaces together comprising applying at a conjoined surface of said two objects a brazing paste without prior nickel coating of said metal objects;
   wherein said brazing paste comprises the brazing paste claimed in claim 3 and heating said objects to a temperature effective to cause said brazing alloys to melt and braze said objects.

9. A method of bonding two metal surfaces together comprising applying at a conjoined surface of said two objects a brazing paste without prior nickel coating of said metal objects;
   wherein said brazing paste comprises the brazing paste claimed in claim 4 and heating said objects to a temperature effective to cause said brazing alloys to melt and braze said objects.

10. A method of bonding two metal surfaces together comprising applying at a conjoined surface of said two objects a brazing paste without prior nickel coating of said metal objects;
    wherein said brazing paste comprises the brazing paste claimed in claim 5 and heating said objects to a temperature effective to cause said brazing alloys to melt and braze said objects.

* * * * *